United States Patent [19]

Ruozzi

[11] Patent Number: 5,919,506
[45] Date of Patent: Jul. 6, 1999

[54] PROCESS FOR MATURING MEAT PRODUCTS

[75] Inventor: Giovanni Ruozzi, Reggio Emilia, Italy

[73] Assignee: I.P.I Impianti E Processi Innovativi SRL, Reggio Emilia, Italy

[21] Appl. No.: 08/874,740

[22] Filed: Jun. 13, 1997

[30] Foreign Application Priority Data

Jun. 13, 1996 [IT] Italy .................................. RE96A0046

[51] Int. Cl.⁶ .................................. F26B 3/00; H05B 6/00
[52] U.S. Cl. ............................. 426/241; 34/263; 426/242
[58] Field of Search .................................. 426/241, 242, 426/243; 34/263

[56] References Cited

U.S. PATENT DOCUMENTS

| | | | |
|---|---|---|---|
| 3,321,314 | 5/1967 | Jeppson | 426/243 |
| 4,168,418 | 9/1979 | Bird | 426/417 |
| 4,619,054 | 10/1986 | Sato | 426/242 |

FOREIGN PATENT DOCUMENTS

| | | |
|---|---|---|
| 912071A1 | 9/1989 | Germany . |
| 1097252A | 6/1984 | U.S.S.R. . |
| 1099935A | 6/1984 | U.S.S.R. . |

OTHER PUBLICATIONS

Brighenti F. et al., "Use of Microwave Drying Under Vacuum in Manufacture or Raw Ripened Meat Products," Technologie Alimentari, vol. 5, No. 3, 1982, pp. 14–19, XP002057643.

*Primary Examiner*—George Yeung
*Attorney, Agent, or Firm*—Birch, Stewart, Kolasch & Birch, LLP

[57] ABSTRACT

A process for maturing meat products, in particular pork products, such as ham, "coppa", bacon, sausage and the like, characterized in that the product is let in a substantially sealed environment at less than atmospheric pressure, heat being supplied to the product to compensate the heat lost by evaporation of its intrinsic water and to maintain its temperature within a predetermined range of values.

11 Claims, 1 Drawing Sheet

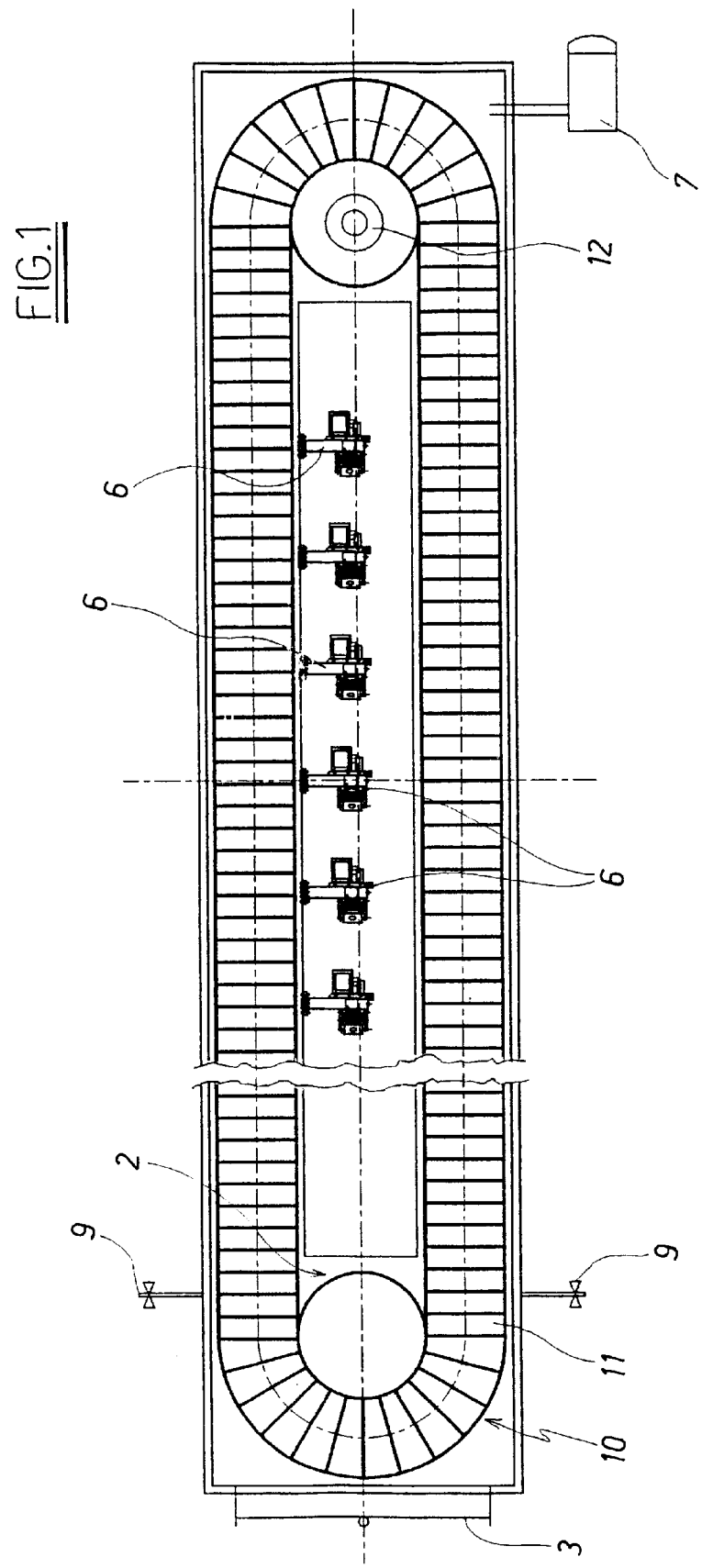

PROCESS FOR MATURING MEAT PRODUCTS

BACKGROUND OF THE INVENTION

The present invention relates to a process and apparatus for the maturing of meat products, in particular pork products, such as ham, "coppa", bacon, sausage and the like.

It has been known from prehistoric times to preserve meat by subjecting it (possibly after salting and/or flavoring) to maturing, ie drying to reduce its intrinsic water.

It is currently known, as it has been for a considerable time, to permit the products to mature in environments in which the microclimate is kept artificially under control to maintain the temperature and humidity within optimum constant ranges.

Such methods ensure that the product does not degrade, however they involve relatively lengthy processing times. For example, ham requires as a minimum many months of maturing.

An object of the present invention is to considerably accelerate the maturing process.

This and other objects are attained by the present invention as characterised in the appendant claims.

SUMMARY OF THE INVENTION

The present invention is based on the concept of leaving the product in a substantially sealed environment at a pressure of less than one atmosphere so that its intrinsic water evaporates relatively quickly, and supplying the product with heat to compensate for the heat lost by evaporation of the intrinsic water and hence maintaining its temperature within a predetermined range of typically between 22 and 25° C.

A further important aspect of the present invention is that the heat is supplied to the product by a microwave field which rapidly heats the product from its inside. Advantageously, the microwave field has a frequency of between 500 and 5000 MHz.

Preferably, the process is implemented in cycles, each of which comprises a longer phase in which the product is left in an environment under vacuum, during which accelerated evaporation of the intrinsic water occur, and a shorter phase in which heat is supplied to the product by a microwave field to compensate for the heat loss by evaporation, while the environment is at substantially atmospheric pressure.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows a section of the plant in a horizontal plane.

DETAILED DESCRIPTION OF THE INVENTION

The illustrated apparatus comprises an airtight chamber 2, advantageously of prismatic shape, having a hermetically sealed door for product introduction and extraction.

Within the chamber 2 a conveyor means is provided, defining an endless product conveying track 11 enclosed within the chamber 2. In particular the device 10 is a conveyor belt driven by a geared motor unit 12 and extending in a horizontal plane to form a ring track.

Along one branch of the track 11 there are positioned a series of microwave generators 6 which are arranged to act on the products positioned on the track 11.

A vacuum pump 7 is connected to the chamber 2 to draw the air and other fluids from the chamber 2.

According to the process of the present invention, the product, e.g., ham, "coppa", salami, bacon, sausage or the like is placed in a substantially sealed environment, for example within chamber 2, where the air is maintained at a relatively low pressure by means of the pump 7. Recommended values are about 10–40 mm Hg.

Hence moisture is transferred from the meat to the chamber 2 by evaporation of the intrinsic water. This occurs continuously and in particular relatively rapidly, with the evaporation being more rapid the lower the pressure in the chamber. The moisture transferred to the chamber 2 is removed by the pump 7.

The evaporation of the intrinsic water of the meat product is accompanied by heat absorption, thereby causing a reduction in the product temperature.

Heat is therefore supplied to the product in an amount to compensate for the loss caused by evaporation and to maintain its temperature within a predetermined range of values. For example, a recommended range is 22–25° C.

Advantageously the product is supplied with heat by a microwave a field, for example by passing the products disposed on the conveyor means 10 in front of the microwave generators 6. Preferably, the microwaves have a frequency within the range of 500 to 5000 MHz.

This technique simultaneously raises the entire or nearly the entire mass of product substantially to the same temperature very rapidly and without any point of the meat exceeding the maximum scheduled temperature of, for example, 25° C.

Advantageously, if the products are composed of large meat masses, as in the case of hams, the heating phase can be implemented in several time periods, each one lasting from one to several minutes, during which periods the magnetic field is activated, alternating with rest periods which are also of the order of one or a few minutes.

In this manner all internal and surface areas of each product, even if of considerable mass, are raised to the required, substantially uniform, temperature relatively rapidly and without any area of the meat exceeding the maximum scheduled temperatures of, for example, 25° C.

In a preferred method of implementing the process, the treatment is effectuated in successive cycles comprising a longer phase in which the product is maintained in a vacuum environment during which moisture is transferred by evaporation, and a shorter phase in which heat is supplied to the product by the microwave field, while the environment is at substantially atmospheric pressure. For example the evaporation phase may last for 3–4 hours whereas the heating of the product by microwave energy may last for only a few minutes. These phases are calculated such that the product temperature always remains within the predetermined temperature range.

EXAMPLE

A typical embodiment of the process using the illustrated apparatus of the present invention comprises the following operation.

The product is placed on the conveyor 10, after which a fairly high degree of vacuum is produced in the chamber 2 (residual vacuum: 20–30 mm Hg) by removing the air and moisture from chamber 2 by means of the pump 7. This causes a relatively rapid evaporation of the intrinsic water of the product, with corresponding product cooling to a temperature towards the minimum of the range within which it is to be maintained, for example, 22–25° C.

Air is then again introduced into the chamber 2 by opening the air ports 9, so as to restore substantially uniform atmospheric pressure in the chamber 2. This air feed also produces a slight heating of the air already present within the chamber 2. The microwave generators 6 are switched on and the conveyor 10 is driven to rotate the product along its ring track, thereby subjecting it as it travels along the branch exposed to the generators 6 to the electromagnetic microwave field, and alternatively to rest periods when travelling along the remaining part of the conveyor path. This phase comprises a few complete revolutions of the product about the ring and lasts for a few minutes. During this phase the product is heated rapidly and substantially regularly throughout its entire mass, to a temperature towards the maximum of the scheduled range. After this, the microwave generators 6 are switched off, the air ports 9 are closed, and the pump 7 is operated to again produce a fairly high vacuum within the chamber 2. The described cycle can be repeated.

The heating phase lasts just a few minutes, while the evaporation phase under vacuum lasts a few hours, e.g., 2–5 hours. The entire process can be automatically controlled by a central electronic processor.

With the illustrated process, it has been experimentally found that the product usually loses between 2.5 and 12 grams/hour of intrinsic water, depending on its size, its type and its degree of maturing. It has also been found that maturing can be accelerated about 30 times, ie that one day of maturing according to the present invention is equivalent to about one month of maturing by the traditional method.

Moreover, because of the fact that the process takes place in a sealed environment and mostly in the presence of only a little air, there is no air circulation, thus ensuring that maturing takes place without surface oxidation or drying.

In addition, as the process comprises two alternate phases under atmospheric pressure and vacuum respectively, the product undergoes compression cycles alternating with expansion cycles, giving rise to a sort of massaging which improves the escape of the intrinsic water and results in a more uniform internal distribution of any salts and flavoring.

As an alternative, instead of alternate phases, the present process can comprise superimposed or nearly superimposed heating and vacuum evaporation phases.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

I claim:

1. A process for maturing meat products which comprises:

processing said meat products in a sealed environment of less than atmospheric pressure to evaporate intrinsic water, and supplying heat to said meat products in an environment of substantially atmospheric pressure to compensate for heat lost through the evaporation of the intrinsic water from the products and to maintain its temperature within a predetermined range, thereby maturing the meat products.

2. The maturing process as claimed in claim 1, wherein heat is supplied to the meat product by means of a microwave field.

3. The maturing process as claimed in claim 2, wherein said microwave field has a frequency within the range of between 500 and 5000 MHz.

4. The maturing process as claimed in claim 2, wherein the heat is supplied to the meat product during a time period followed by a rest period when heat is not provided.

5. The maturing process as claimed in claim 2, divided into cycles, each of which comprises a long phase during which the product is left in an environment under vacuum, and a short phase during which heat is supplied to the product by a microwave field while the environment is at substantially atmospheric pressure.

6. The process of claim 1, wherein the temperature of the product is maintained within the range of 22 to 25° C.

7. The process of claim 5, comprising a plurality of cycles.

8. The process of claim 1, wherein the processing step is conducted at a pressure of 10 to 40 mm Hg.

9. The process of claim 4, wherein a plurality of heat periods and rest periods are alternately conducted.

10. The process of claim 1, wherein the processing of the products is conducted for 3–4 hours wherein the heating of the products is conducted for at least one minute.

11. The process of claim 1, wherein by alternately processing the meat products in an environment of less than atmospheric pressure and heating the meat products in an environment of substantially atmospheric pressure, the meat products undergo alternating compression and expansion cycles which massages the meat products which improves the escape of the intrinsic water and produces a more uniform distribution of salts and flavoring.

\* \* \* \* \*